H. N. WAYNE.
UNIVERSAL JOINT.
APPLICATION FILED DEC. 23, 1920.
1,424,051.
Patented July 25, 1922.
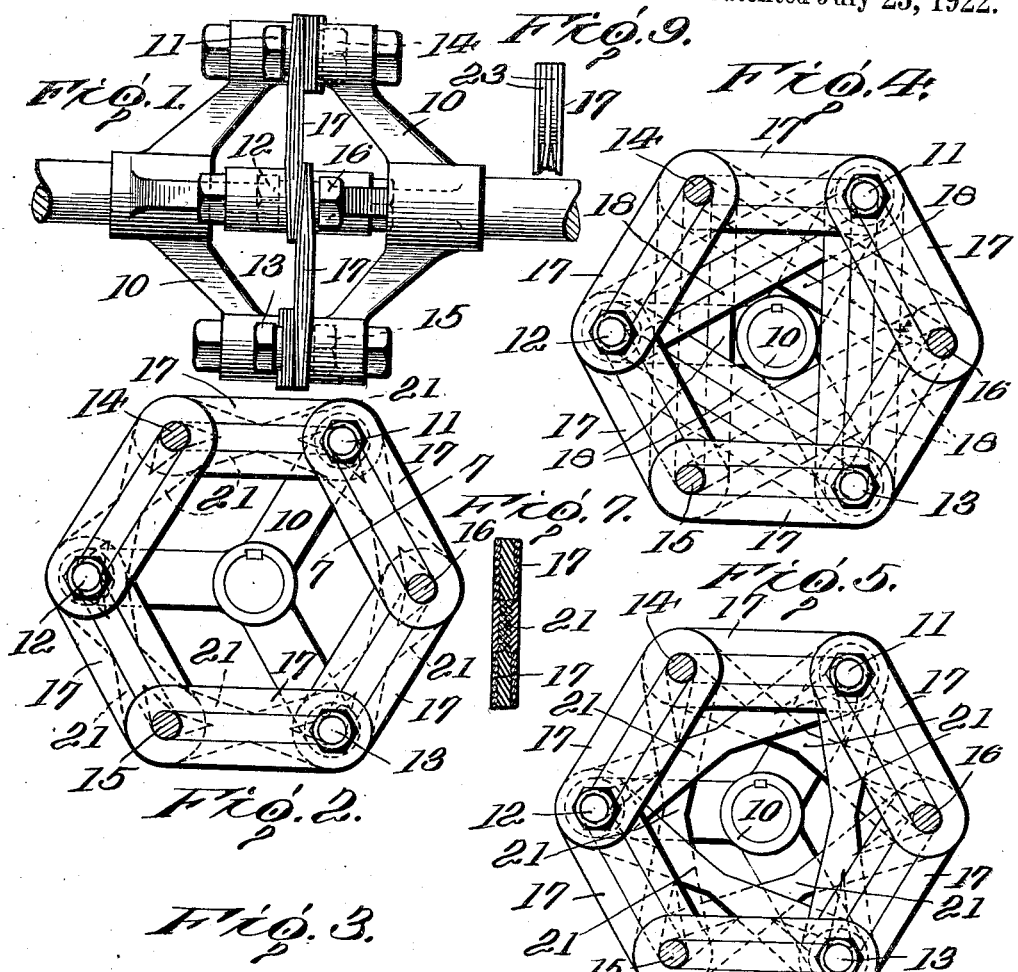
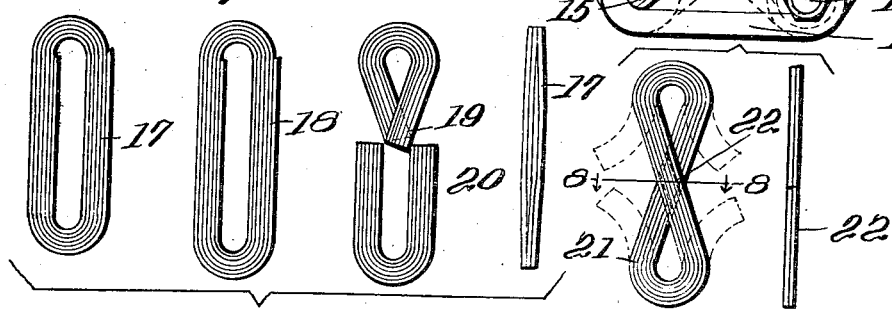
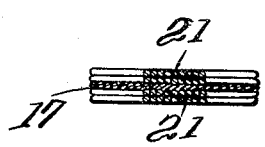
Inventor
H. N. Wayne
By Walter F. Rogers
Attorney

UNITED STATES PATENT OFFICE.

HERBERT N. WAYNE, OF WASHINGTON, DISTRICT OF COLUMBIA.

UNIVERSAL JOINT.

1,424,051.  Specification of Letters Patent.  Patented July 25, 1922.

Application filed December 23, 1920. Serial No. 432,672.

*To all whom it may concern:*

Be it known that I, HERBERT N. WAYNE, a citizen of the United States, residing at Washington, in the District of Columbia, have invented certain new and useful Improvements in Universal Joints; and I do hereby declare the following to be a full, clear, and exact description of the invention, such as will enable others skilled in the art to which it appertains to make and use the same.

My invention relates to flexible joint couplings of the kind used for connecting shaft sections, for example, in transmission of power in automobiles, in which the driven shaft element and the driving shaft element are provided at their adjacent ends with studs so that the driving studs and the driven studs are alternately disposed in the same plane; a disk or ring provided with suitable holes being slipped on to the studs to transmit the drive.

The object of the invention is to provide a flexible, elastic transmission disk between the adjacent ends of the driving and the driven shaft members which, while being sufficiently elastic to absorb all shocks incident to a sudden application of power, will possess ample rigidity of traction pull to insure the prompt transmission of power without appreciable lost motion. Another object of the invention is to provide a construction whereby the line of least resistance to side distortion will be directed through a tangential line drawn intermediate between the studs, at which intermediate point the disk is reinforced especially to protect it against rupture. All present forms of transmission drives known to applicant are constructed to offer uniform resistance throughout their entire structure, and are consequently without any control over the direction of side distortion other than at the stud connections. This lack of control over the direction of distortion or buckle causes the buckle to take place at the weakest point, if such a weak point is inadvertently permitted to exist.

My object is to establish a neutral point of flexion and to then reinforce that particular point; and another object is to bind together the driving studs and the driven studs by means of a series of flexible elastic connections in the form of individual connecting belts constructed of rubberized cord wound so that the several cords will produce an oblong ring form; or a similar construction may be spliced and each part turned upon the other into what may be called a figure 8 form, though more nearly resembling the form used as a sign of infinity. Each belt is adapted to fit at each end snugly about the driving element or driven stud, and so that all of the cords may be combined into one composite disk or ring as if having a hole at each end to pass over a stud. Such a construction will possess uniform tensile strength circumferentially of the disk which may be applied to the studs and form an element of the coupling with complete indifference to the direction of the torque.

In the preferred form of my coupling 1 use in the formation of the disk two belts which give direct connection between each two adjacent studs and another belt which gives indirect connection between the two adjacent studs, although I may, if desired, reverse this arrangement. The direct belt connection is made up of a continuous winding of rubberized cord, this cord being tightly wound about a form and then vulcanized or semi-vulcanized to hold the whole in permanent shape, as particularly described hereinafter.

The indirect connection or belt is constructed in a similar elongated form, so that when removed from the form it may be cut, preferably at the center or at points equidistant from the center, and then the two parts may be so turned that when they are brought together and spliced the resultant part will have substantially the form of a figure 8 or the infinity form, as stated. That is, the direct form is simply the ordinary endless belt form; while the indirect connection is on the principle of a crossed belt. Obviously in the indirect connection the line of resistance or pull of the inner windings of the cord adjacent to one of the studs is exerted against the outer windings of the cord encircling the other connected stud, thus distributing the tension force over a wide area and creating an elastic cushioning effect which will absorb the shocks of the sudden application of power and without the surrender of any transmission.

It is evident that these flexible, elastic connecting belts between the driving and driven studs would be effective were they mounted in separate units, but it is preferable, for convenience in applying the same, that they be combined and united in one unitary ring or disk and this can best be accomplished by embedding them in a body of rubber and vulcanizing the whole together in a compact form, as is done with each belt, for example, in Figs. 7 and 8 as hereinafter described. If it is desired to construct a disk possessing a greater structural strength and with a wider distribution of the lines of resistance I may extend these additional lines between each alternate stud, thus reinforcing the whole disk by connecting together all driving elements in one series and all driven elements in another series as illustrated.

In the drawing, Figure 1 is an elevation of a coupling with the simple form of disk applied;

Fig. 2 is a plan view of a disk as applied to the spider of the coupling of Fig. 1, showing the alternating arrangement of direct and indirect belt connections;

Fig. 3 illustrates a simple unit and a unit which may be cut and spliced to produce the figure 8 shown also in side elevation as completed;

Fig. 4 is a plan view of a coupling with the adjacent studs and also the alternate studs connected by the simple form of belt of different lengths;

Fig. 5 is a plan view showing a combination of units including that shown in Fig. 6 in which view the parts of a unit are indicated as having been spliced and having been brought together in what may be termed the figure 8 form;

Fig. 7 is a section through the line 7—7 of Fig. 2;

Fig. 8 is a section on the line 8—8 of Fig. 6.

Fig. 9 is a modification showing the application of washers as hereinafter described.

In these drawings 10 represents a metal spider of a coupling. 11, 12 and 13 represent what may be termed the driving studs or posts while 14, 15 and 16 represent the driven studs or posts.

In Fig. 3, 17 represents a simple form of belt made up of a series of rubberized cords wound spirally around an oblong form. 18 represents a longer belt which may be used for connecting alternate belts as in Fig. 4 or may be transversely cut at the center, as illustrated at 19, the same illustration showing the separated ends bent over each other and adapted to be spliced up to the separated ends of the lower part 20 so that the completed unit roughly will be of a figure 8 form. In Fig. 6 I have illustrated another figure 8 form as at 21, in which the two divisions are cut to leave projecting flaps which may encircle the stud ends so that all the parts may be brought together as illustrated at 22. In the form of Figure 3 the cords are centrally cut through; in that of Fig. 6 they are cut through at two points one above and the other below the center.

In Figs. 3 and 6 I have illustrated units which may either be used singly or in unison. For example, I may use a unit like the shortest one 11, in Fig. 3, that is, a series of conjoined cords forming a belt by which I may connect the adjacent studs, as, for example, 11, 12, if a single one were used in Fig. 1 or without the dotted lines in Fig. 2. Fig. 2, for example, illustrates a combination also of a simple oblong form 17, and the crossed form 19, there being in this example a top oblong form a middle crossed form and a bottom oblong form. That is, the three units are put together each one forming a separate belt, or, if preferred, all of the forms are joined together so as to produce a disk made up of the separate units. In Fig. 4 the same plan is followed excepting that in this form as illustrated the longer belts 18 are shown in that figure beneath the shorter belts. Again in this form I may also join all the belts together to form a disk. In Fig. 5 I have shown a form of disk composed of the units of Fig. 3 and of Fig. 6 alternating, the units of Fig. 6 however running as in Fig. 4, the short belts connecting adjacent studs the longer ones connecting alternating studs.

In Fig. 7 I have shown a cross section of the form illustrated in Fig. 2; and also a cross section of modified form described, in which there would be two cross or indirect belts and an intermediate direct belt.

In the form shown in Fig. 4 there will be two units between the alternate studs and passing between the points of connection of the top and bottom units. That is, the longer units will connect the stud which receives the two adjacent shorter belts to a stud on the opposite side which also receives the two shorter belts. In Fig. 4, for example, the shorter units will constitute the periphery of the disk, but the disk will be reinforced at the junction of the shorter units by the longer unit and all these longer units will lie within the periphery of the disk and their planes will cross each other as the longer belt runs, for example, from the stud 11 to the stud 12 while the crossing longer units would also connect the same stud. The outer units will in a six stud coupling as shown, form a hexagon while the longer units will form two intermediate isosceles triangles crossing each other so as to in effect present a star form. Where more than six studs are employed the longer belts will connect studs substantially in like manner but the studs connected by each of the longer belts will be driving and driven studs. In Fig. 5 there is a same arrangement of shorter units and substantially the same arrangement of the longer unit, the difference being, as shown, that each triangle is reduced in the center of each side by reason of the cross arrangement of the longer units. In effect however, Figs. 4 and 5 are identical, the action of the interlacing disks being the same in each case and distributing the torque effects about the studs of the coupling. I have also provided for the necessary buckle in these forms. For example, in Fig. 2 the short units will come together so that the flexible part of the combined units will be at the longitudinal center of each belt because the central belt will be crossed and the inner and outer belts will be separated by flexible rubber, providing thus for the buckle to take place at just the desired point. While all these belts are in a degree elastic and all of course are flexible, the belt of Fig. 6 is particularly elastic because in that form the connection of the inner cord with the studs is such that in the center form the inner cord takes about each stud while in the cross form of Fig. 6 the inner cord takes about one stud and then passes over to the outside of the connected stud. It is indicated for example by the heavy lines in Fig. 6.

I prefer to insert in any form, a thin metal washer, 23, over each stud and disposed between each superposed belt. The purpose of this washer would be to preserve the structural uniformity of each belt where it encircles the stud.

What I claim is:

1. In a power coupling, a series of studs extending from each coupling member, and a disk made up of a plural series of flexible belts, each belt connecting a pair of studs and each belt of one series comprising a series of straight cords and each belt of another series comprising a series of crossed cords, the several cords being bound together by rubber.

2. In a power coupling, a series of studs extending from each coupling member, and a disk made up of a plural series of flexible belts, each belt connecting a pair of studs and each belt of one series comprising a series of straight cords and each belt of another and intermediate series comprising a series of crossed cords, the several cords being bound together by rubber.

3. A power coupling comprising driving studs and driven studs and a disk connecting the studs and comprising a series of belts, each belt being composed of alternating units of straight and crossed cords.

4. In a power coupling, a series of studs extending from each coupling member, a series of belts connecting the studs and forming a disk with polygonal periphery, and a series of belts engaging alternate studs so as to form disks of triangular form engaging alternate studs.

5. In a power coupling, a series of studs extending from each coupling member, and a flexible disk, having holes to receive the studs, and formed of a series of short flexible belts, each belt connecting adjacent pairs of studs, and a series of longer belts each connecting pairs of studs that are not adjacent.

6. In a power coupling, a series of studs extending from each coupling member, and a flexible loop for connecting pairs of said studs, said loop having the strands thereof crossing each other between the studs, whereby the strands of the loop in encircling one stud, becomes reversed in its encircling relation upon the other stud.

7. In a power coupling, a series of studs extending from each coupling member, and a flexible loop for connecting pairs of said studs, said loop being so formed that the strands forming the loop pass around one stud and after they cross pass around the other stud in the opposite direction.

8. In a power coupling, a series of studs extending from each coupling member, and a flexible loop for connecting pairs of said studs, said loop being formed of cords laid one upon the other and the loops formed by joining each side portion thereof between the ends with the opposite side portions to form a crossing of said intermediate portion, as and for the purpose set forth.

9. In a power coupling, a series of studs extending from each coupling member, and a flexible loop for connecting pairs of said studs, said loop being formed of cords laid one upon the other and the loops formed by joining each side portion thereof between the ends with the opposite side portions to form a crossing of said intermediate portion, the cords of the several layers in one portion joining with the cords of the other portion in reverse arrangement, as and for the purpose set forth.

In testimony whereof I affix my signature.

HERBERT N. WAYNE.